Sept. 9, 1930.  W. E. NILES  1,775,291
FISHING TOOL
Filed Oct. 15, 1928

INVENTOR.
William E. Niles.
BY
ATTORNEY

Patented Sept. 9, 1930

1,775,291

UNITED STATES PATENT OFFICE

WILLIAM E. NILES, OF KANSAS CITY, MISSOURI

FISHING TOOL

Application filed October 15, 1928. Serial No. 312,415.

My invention relates to fishing tools such as commonly used in oil field practice for recovering equipment from a well, the principal object of the invention being to let a fishing tool into a well for lateral engagement with the piece of equipment to be recovered and enforce engagement with the equipment for lifting the equipment when the tool is lifted.

One of the most difficult problems in recovering equipment from a well has to do with the rescue of a whip stock that may have been positioned on the upper end of lodged tools for diverting and by-passing drilling tools around the lodged equipment. In ordinary practice a whip stock has a longitudinal groove gradually decreasing in depth from the upper end toward the lower end for guiding the operating tools around the lodged equipment, and a hole in its upper end in which the hook of the fishing tool is adapted to engage for recovering the whip stock and removing it from the well after it has served its purpose. Because of the weakened character of the the upper end of the whip stock with which the fishing tool must engage, the whip stock is frequently broken during the effort to recover it, and large sums are often spent ineffectually in the effort to remove broken whip stocks, since no tools have heretofore been provided by means of which a broken whip stock can be recovered.

The well in which a broken whip stock is lodged is usually considered unworkable and serious losses are incurred because of the lack of means for recovering broken whip stocks.

It is therefore a further and particular object of my invention to provide means for recovering a whip stock without hazard of damage to the whip stock and especially broken whip stocks may be recovered, whereby the hazard of rendering wells unworkable through the application of a whip stock to a well choked by lodged operating tools may be avoided, the use of whip stocks for enabling the continuation of drilling operations on a well locked by lodged tools may be promoted and valuable wells otherwise subject to abandonment may therefore be developed.

In accomplishing these and other objects of the invention I have provided improved details of structure, the preferred forms of which are illustrated in the accompanying drawings, wherein.

Figure 1:
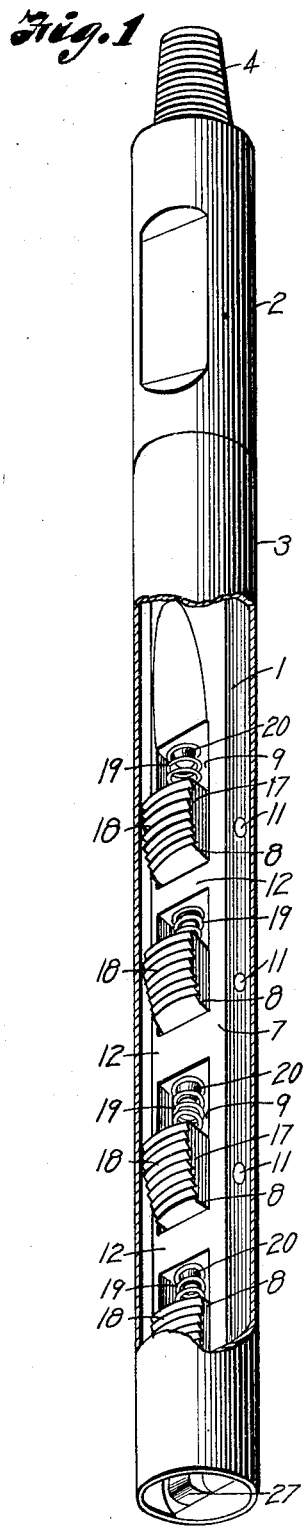
Fig. 1 is a perspective view of a fishing tool embodying my invention, part of an enclosing sleeve being broken away to disclose dogs for engaging lodged equipment, and means for mounting the dogs in the tool.

Referring in detail to the drawings:

1 designates a dog-supporting bar or body having a cylindrical neck 2 to receive a tubular sleeve 3 comprising a sheath adapted to be welded to the neck and extend over the body to the lower end thereof and enclose dogs as later described. A threaded pin 4 at the upper end of the neck is adapted for engagement with the socket portion 5 of suitable suspending means such as a jar.

The body is of less diameter than the neck in one direction, preferably having a semi-cylindrical surface 6 and a flat face 7, and may be formed from a cylinder including the neck and from which a longitudinal segment has been removed to produce the flat face and reduced thickness of the body.

Toothed members or dogs 8 are pivotally and preferably eccentrically mounted on the body in a longitudinal series, and the body is recessed or grooved to receive the dogs, recesses 9 being formed in the face 7 in a longitudinal series, and the dogs having relatively large openings 10 for mounting on pins 11 mounted in the body transversely of the recesses and adjacent the lower walls thereof.

The recesses are separated by partitions 12 having upper faces constituting the lower walls of the recesses and comprising arcuate portions merging with the bottoms of the recesses to form curved seats 13 and flat portions 14 at the outer edges of the recesses constituting resting or stop shoulders, for purposes presently described.

The dogs have arcuate portions 15 adapted to engage the curved seats 13, and flat outer end portions 16 for engaging the stop shoulders 14, in normal rest position, the openings 10 being large enough to permit the dogs to shift slightly vertically, and also to provide for relief of strain on the pins when pressure is applied to the dogs to cause the same to bear on the bottoms of the recesses. The openings are preferably elongated as illustrated, for further facilitating the operation of the dogs as later described.

The dogs further comprise toothed portions 17 projecting from the plane of the body preferably in all positions, the toothed faces 18 thereof being preferably arcuate longitudinally to provide for varying degrees of extension of the dogs from the recesses, and shaped laterally for conformity to convex surfaces of lodged equipment to which the device may be applied. The toothed faces 18 preferably extend on an upwardly outwardly inclined line with reference to the axis of the supporting body when the dogs are in rest position, and extend substantially parallel with said axis when the dogs are pivoted and shifted during operation, as presently described. The teeth incline upwardly when the dogs are in outward position.

Figure 2:
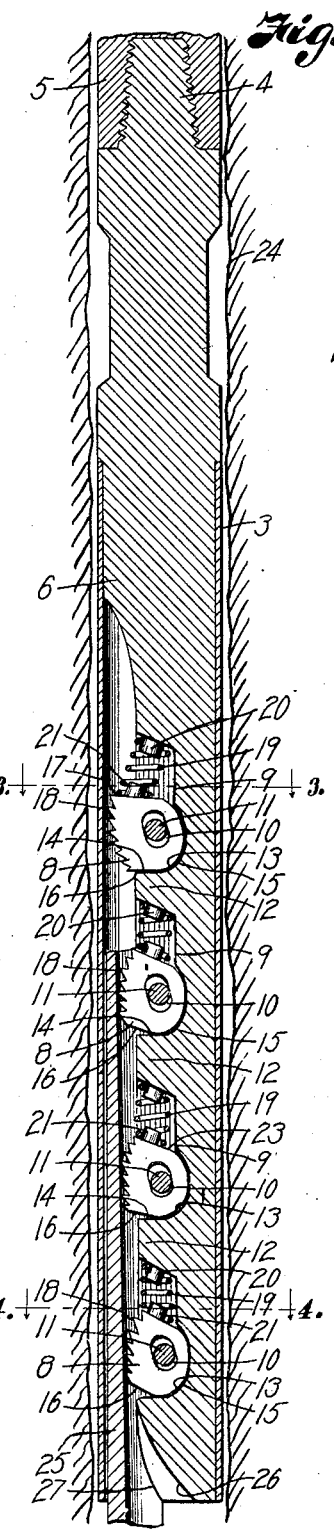
Fig. 2 is a vertical central sectional view of the device illustrating its appplication to the upper end of a whip stock in a well hole.
Figure 3:
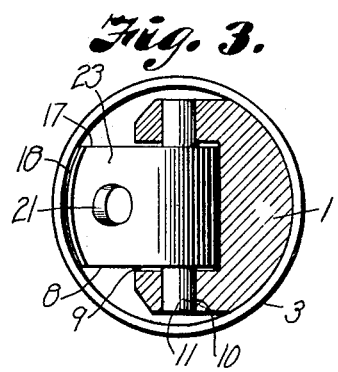
Fig. 3 is a cross sectional view of the device on the line 3—3, Fig. 2, above the area of engagement with a whip stock.
Figure 4:
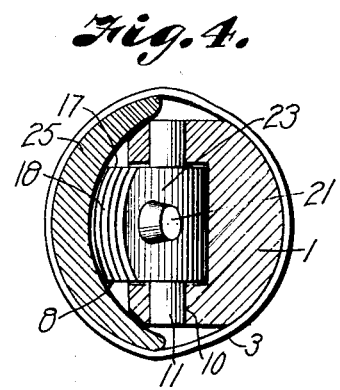
Fig. 4 is a cross sectional view of the device on the line 4—4, Fig. 2, illustrating the distortion of the sleeve when the device is operably engaged with a whip stock.

Springs 19 mounted on studs 20 and 21 extending respectively at suitable angles from the lower faces of the partition 12 and upper faces 23 of the pivoted dogs are adapted to urge the dogs to seated position in which the toothed portions extend furthest from the recesses and permit the dogs to pivot inwardly when the tool is inserted in a well and the pivoted dogs encounter a whip stock, as illustrated in Fig. 2, wherein 24 designates a well hole and 25 the upper end of a whip stock.

When the device is moved downwardly over a whip stock the latter will be clamped by the sleeve against the dogs, and when the device is lifted the dogs will tend to pivot outwardly from the recesses and securely engage the whip stock.

The lower end of the body is beveled as indicated at 26 and a longitudinal tongue 27 is formed centrally on the beveled surface to provide an enlarged mouth and a guide for facilitating the passage of the device over the upper end of the grooved whip stock.

The sleeve is formed of relatively soft and tough material adapted to resist tensional strain and permit distortion without breaking, so that when the device is moved over a whip stock the sleeve will stretch without breaking.

In applying the invention to the recovery of a whip stock, the body is provided with the plurality of dogs as illustrated in the accompanying drawings, and with the sleeve. The device is lowered into the well in which the whip stock is lodged and the beveled lower end provides a relatively large mouth for assuring the passage of the sleeve and body over the upper end of the whip stock, the tongue sliding in the whip stock groove and guiding the device into functioning position. The laterally convex toothed faces of the dogs conform substantially to the lateral contour of the face of the groove in the whip stock.

As the device moves downwardly, the sleeve is stretched over the back of the whip stock, and extends over a relatively large area in its engagement with the back, to latch the whip stock to the device. The tapering face of the whip stock engages the dogs successively and pivots them clockwise as illustrated in Fig. 2, to cause them to move into the recesses against the influence of the springs and permit the device to continue its downward movement over the whip stock.

One or more of the dogs may engage with the whip stock during an operation.

When the device is lifted, the engaged dogs grip the tapered surface of the whip stock, and the sleeve restrains the whip stock and enforces the biting engagement of the teeth with the same. The dogs tend to rotate anti-clockwise under the restraining influence of the whip stock and the toothed portions tend to move further from the recesses and therefore bite more deeply into the whip stock.

It is apparent that the number of dogs and the particular curvature of their arcuate faces may be varied for adapting the device to grapple a particular type of equipment to be recovered from a well, and that the sleeve element which furnishes the resistance for enforcing the engagement of the dog with the piece of equipment may also be used and adapted suitably to the nature of the lodged equipment and its position in the well.

What I claim and desire to secure by Letters Patent is:

1. A fishing tool of the character described, comprising a body having a plurality of recesses and curved seats in the recesses, tool engaging members movably mounted in the recesses, said seats limiting the movement of said members, and means engageable with a tool adapted to be recovered by the device for enforcing the engagement of said members with the tool.

2. In a fishing device of the character described for recovering tools from an oil well, a shaft having a recess and a horizontal shoulder forming the lower wall of the recess, a member pivotally supported in the recess and having a toothed face projecting therefrom and a flat portion engageable with said shoulder for limiting the pivotal movement of the member, and means for yieldingly holding said flat portion against the shoulder.

3. In a tool recovering device of the character described, a support, a tool engaging member pivotally mounted on the support and having a toothed portion extending arcuately longitudinally of the support and arcuate laterally for conforming to the contour of the tool, means on the support limiting the movement of said member, and a sleeve restrained by the support and engageable with the tool for enforcing the engagement of the member with the tool.

4. In a tool recovering device of the character described, a support, a pivot pin mounted transversely on the support, a tool engaging member having opposite support engaging and tool engaging faces and an opening substantially larger than the cross section of the pin for mounting the member on the pin, and a tool retaining member enclosing said tool engaging member for urging the tool into engagement with the tool engaging member.

5. In a tool recovering device of the character described, a body having a portion of reduced diameter, a pivot pin mounted on said portion, tool engaging means pivotally and slidably mounted on the pin, means for enforcing engagement of said tool engaging means with a tool to be recovered from a well, and guide means including said enforcing means for guiding the body over the end of the tool.

6. In a tool recovering device of the character described, a support, tool engaging means including a member movably mounted on the support and guide means at the lower end of the support including a longitudinally tapering wall and a tongue-like boss extending longitudinally on said wall for guiding the device over the end of the tool.

7. In a tool recovering device of the character described, a body having a cylindrical neck, toothed members comprising dogs pivotally supported by the body and having outer vertical faces provided with transverse teeth and other faces engageable with the body for limiting the rotation of the dogs, and a distortable sleeve fixed to the neck and enclosing the dogs and adapted to pass over the tool, said sleeve bearing against the body to retain the tool in frictional engagement with the dogs.

8. A fishing tool for recovering whip stocks and the like from a well, a body, a distortable sleeve on the body engaging one side thereof and adapted for shaping to the shape of a whip stock for distributing frictional engagement between the sleeve and the whip stock, and a toothed member on the body engageable with the whip stock for pressing the whip stock against the skirt to shape the same.

9. In a fishing tool of the character described including a body, and a member mounted on the body and having a vertically extending face engageable with a whip stock, a distortable skirt engaging the body and movable over the side of the whip stock opposite to the said member and adjustable to the shape of said side under pressure of said member restrained by the skirt-engaged body where the face thereof is engaged with the whip stock.

10. In a fishing tool for recovering whip stocks and the like, a sleeve, a shaft in the sleeve having a semi-cylindrical face engaging the sleeve and a flat face producing a channel in which a lodged whip stock may be received when the device is lowered in a well, and a cam-faced dog pivotally mounted on the flat face of the shaft adapted to press the whip stock against the sleeve when the shaft and sleeve are lifted.

In testimony whereof I affix my signature.
WILLIAM E. NILES.